Jan. 17, 1939.                F. A. HOLBY                    2,144,292
                      FUEL TANK MOUNTING FOR TRUCKS
                          Filed Jan. 5, 1937
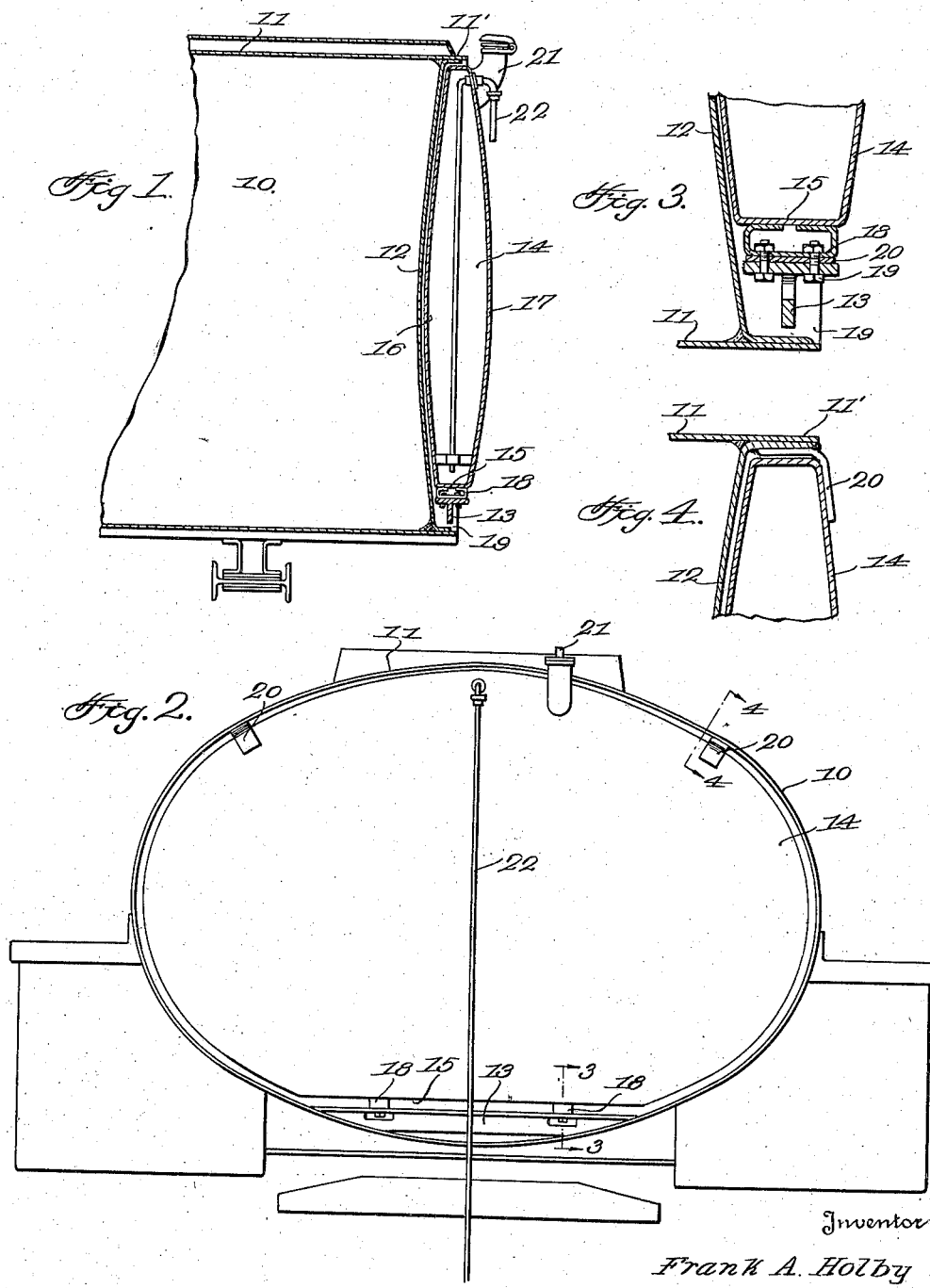
Inventor
Frank A. Holby
By Cushman, Darby & Cushman
Attorneys Patented Jan. 17, 1939

2,144,292

UNITED STATES PATENT OFFICE 2,144,292

FUEL TANK MOUNTING FOR TRUCKS

Frank A. Holby, New York, N. Y., assignor to The William F. Kenny Company, New York, N. Y., a corporation of New York Application January 5, 1937, Serial No. 119,144

4 Claims. (Cl. 280—5)

The present invention relates to tank trucks, and more particularly to a construction whereby the fuel tank for the engine of the truck is conveniently and safely mounted with respect to the main truck body.

In trucks of this character, where the chassis or running gear of the truck is very completely occupied by the main tank, the problem of mounting an adequate fuel supply tank for the truck engine presents some difficulty.

It is the purpose of the present invention to solve this problem by the novel manner of mounting disclosed herein, which not only disposes of the engine fuel tank without affecting the capacity of the main fuel carrying tank, but so protects the engine fuel tank as to eliminate or minimize danger of breakage or rupture of the engine fuel tank in case of accident.

In the drawing herewith I have illustrated one form of my invention, and in the drawing:

Figure 1 is a view partly in section of so much of a truck tank as is necessary to illustrate my invention with the engine fuel tank mounted thereon.

Figure 2 is an end view of the truck tank and the engine fuel tank.

Figure 3 is a section substantially on line 3—3 of Figure 2, and

Figure 4 is a section substantially on line 4—4 of Figure 2.

Referring to the drawing, reference numeral 10 designates generally the front end portion of the tank of a tank truck, the tank having an elliptical metal shell or wrapper 11 and an end wall 12 which, as here shown, is inwardly concaved and has an outwardly directed peripheral flange secured against the inner face of the shell, a relatively deep chine 11' being provided.

Arranged as a chord at the bottom of the chine and rigidly secured thereto is a horizontal T-beam or strut 13.

The engine fuel tank, generally designated at 14, is shaped as is the chine of the main tank above strut 13 and is of a size to fit within the recess defined by the chine, and with a slight peripheral clearance, if desired. The tank 14 has a flat bottom wall 15 and convexed rear and forward walls 16 and 17, the convexity of the wall 16 substantially mating the concavity of the end wall 12 of the main tank.

Interposed between the bottom 15 of tank 14 and the beam of strut 13 are a pair of feet 18 formed by bending strips of metal into substantially rectangular form, these feet being secured as by welding to the bottom of wall 15 and being bolted to the strut 13 by bolts as at 19. Pads 20 of rubber or similar material are interposed between the feet 18 and the strut 13.

In order to stay the upper portion of the engine fuel tank in its position within the end recess of the main tank, I provide brackets 20, of which two are shown, these brackets being of substantially L-shape with one limb secured as by welding to the chine and the other gripping over the wall 17 of the auxiliary tank, preferably without being secured to the latter. In assembly the upper end of the auxiliary tank is slid up under the depending arms of the bracket 20 and the feet may then be bolted to the strut 13. The depending arms of the brackets are sufficiently springy to hold the upper end of the auxiliary tank in position against wall 12. If desired, spacer means may be interposed between the upper end of the auxiliary tank and the end wall of the main tank and the lower end of the auxiliary tank may be secured in somewhat spaced relation to the wall 12, so that an air space is provided between walls 12 and 16.

The engine fuel tank 14 is provided with a filler spout 21 and with a gasoline line 22 which leads to the engine, fuel being withdrawn through line 22 in any usual manner.

It will be seen that in the illustrated embodiment the auxiliary tank is almost entirely within the end recess of the main tank, so that considerable protection is afforded it. Furthermore, it occupies what has hitherto been merely waste space.

It will be understood that the invention is not limited to the exact disclosure herein, since numerous variations in the form and the manner of association of the parts are possible within the scope of the invention as defined in the following claims.

I claim:

1. The combination with a main tank having a recess in a wall thereof, of a supplemental tank mounted within the recess, a horizontally disposed strut in the recess to support said supplemental tank, resilient members interposed between said supplemental tank and strut, means for securing said supplemental tank in place in the recess, a filling spout for said supplemental tank, and a feed line leading from said supplemental tank.

2. The combination with a main tank having a recess in its forward end having an inwardly concaved rear wall and a surrounding circumferential wall, of a supplemental tank conforming substantially to the contour of the recess mounted in the recess and spaced from the walls thereof, a horizontally disposed strut at the bottom of said recess to support said supplemental tank, resilient members interposed between said supplemental tank and strut, means engaging the upper portion of said supplemental tank to hold it in place in the recess, a filling spout for said supplemental tank, and a feed line leading from said supplemental tank.

3. The combination with the main tank of a tank truck, said tank having a forwardly presented chine of substantial depth and a forward end wall which is inwardly concaved, of a horizontal strut secured in the chine near the base of the tank; and an engine fuel tank mounted on said strut and substantially filling the recess defined by said end wall, chine and strut; said engine fuel tank having a convexed wall substantially mating with the end wall of the main tank.

4. The combination with the main tank of a tank truck, said tank having an upright end wall and a chine of substantial depth projecting therebeyond, of a horizontal strut secured in the chine near the base of the tank; and an auxiliary tank mounted on said strut and substantially filling the recess defined by said end wall, chine and strut; said auxiliary tank having a wall adjacent said end wall substantially conforming to the latter, and means secured to the main tank and engaging the upper portion of the auxiliary tank for retaining the latter in position.

FRANK A. HOLBY.